United States Patent
Huang

[11] Patent Number: 5,260,835
[45] Date of Patent: Nov. 9, 1993

[54] VEHICLE REAR VIEW MIRROR

[76] Inventor: Shu-Chen Huang, P.O. Box 1032, Tainan, Hsien, Taiwan

[21] Appl. No.: 981,415

[22] Filed: Nov. 25, 1992

[51] Int. Cl.⁵ .......................... G02B 7/184; B60R 1/02
[52] U.S. Cl. .................... 359/872; 359/841; 248/481
[58] Field of Search ............... 359/841, 844, 871, 872, 359/875, 881, 882; 248/479, 480, 481, 482

[56] References Cited

U.S. PATENT DOCUMENTS

| | | | |
|---|---|---|---|
| 2,146,859 | 2/1939 | Seklehner | 248/481 |
| 4,789,232 | 12/1988 | Urbanek | 248/479 |
| 4,800,795 | 1/1989 | Yamashita | 248/481 |
| 4,860,989 | 8/1989 | Rose et al. | 248/471 |
| 4,923,162 | 5/1990 | Fleming et al. | 248/481 |
| 5,106,177 | 4/1992 | Dolasia | 359/872 |
| 5,109,301 | 4/1992 | Yang | 248/481 |

Primary Examiner—Martin Lerner
Assistant Examiner—Darryl Collins
Attorney, Agent, or Firm—Pro-Techtor International

[57] ABSTRACT

A vehicle rear view mirror includes a mirror body coupled to a base by a coupler, the coupler includes a bolt engaged to the base and a ball disposed on an upper portion of the bolt, and a shell force-fitted on the ball and embedded within the body such that the body is stably supported in place.

1 Claim, 2 Drawing Sheets

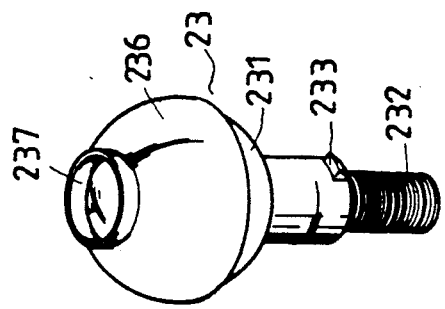
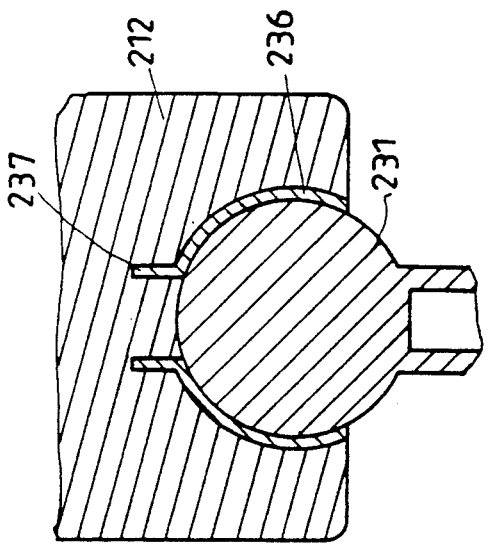
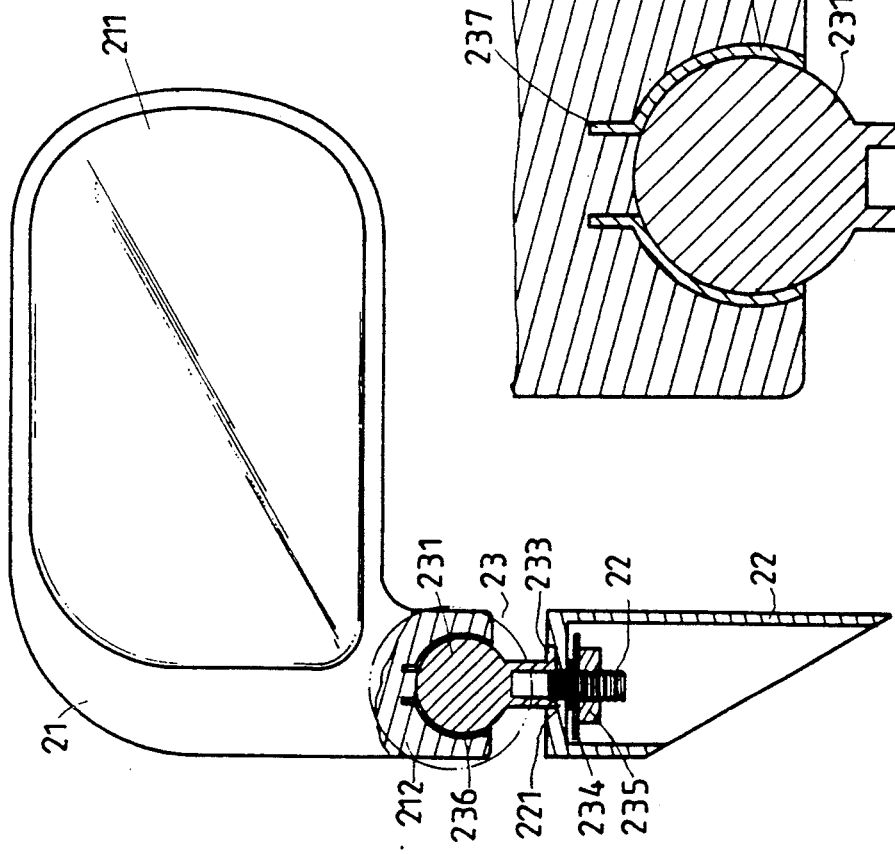

VEHICLE REAR VIEW MIRROR

BACKGROUND OF THE INVENTION (a) Field of the Invention

The present invention relates to a rear view mirror, and more particularly to a vehicle rear view mirror.

(b) Description of the Prior Art

A typical vehicle rear view mirror is shown in FIG. 4 and comprises a body 11 coupled to a base 12 by a coupler 13, the body 11 includes a mirror 111 disposed therein and an extension 112 extended downward therefrom; the base 12 is fixed to the vehicle and includes an aperture 121 formed therein; the coupler 13 includes a ball 131 rotatably engaged in the extension 112 of the body 11, and a bolt 132 extended downward therefrom and extended through the aperture 121 of the base 12 and threadedly engaged with a nut 135 so that the coupler 13 can be fixed to the base 12, a washer 134 is engaged between the base 12 and the nut 135. The coupler 13 further includes a stop 133 engaged with the base 12 so that the coupler 13 is prevented from rotating relative to the base 12 and so that the nut 135 can be engaged to the bolt 132.

However, the extension 112 of the body 11 is formed on the ball 131 by molding processes and both the extension 112 and the ball 131 are made of plastic materials such that the extension 112 can not solidly grip the ball and can not stably hold the ball 131 in place, and such that the engagement between the ball 131 and the extension 112 will easily become loose and can not sustain the weight of the body 11.

The present invention has arisen to mitigate and/or obviate the afore-described disadvantages of the conventional vehicle rear view mirrors.

SUMMARY OF THE INVENTION

The primary objective of the present invention is to provide a vehicle rear view mirror in which the mirror can be stably supported in place.

In accordance with one aspect of the present invention, there is provided a vehicle rear view mirror comprising a body, a base, and a coupler coupling the body to the base and including a bolt engaged to the base and a ball disposed on an upper portion of the bolt, and a shell force-fitted on the ball and embedded within the body such that the body is stably supported in place.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a partial cross sectional view of a vehicle rear view mirror in accordance with the present invention;

FIG. 2 is an enlarged cross sectional view illustrating the engagement between the coupler and the extension of the mirror body;

FIG. 3 is a perspective view of the coupler; and

DETAILED DESCRIPTION OF THE INVENTION

Figure 4:
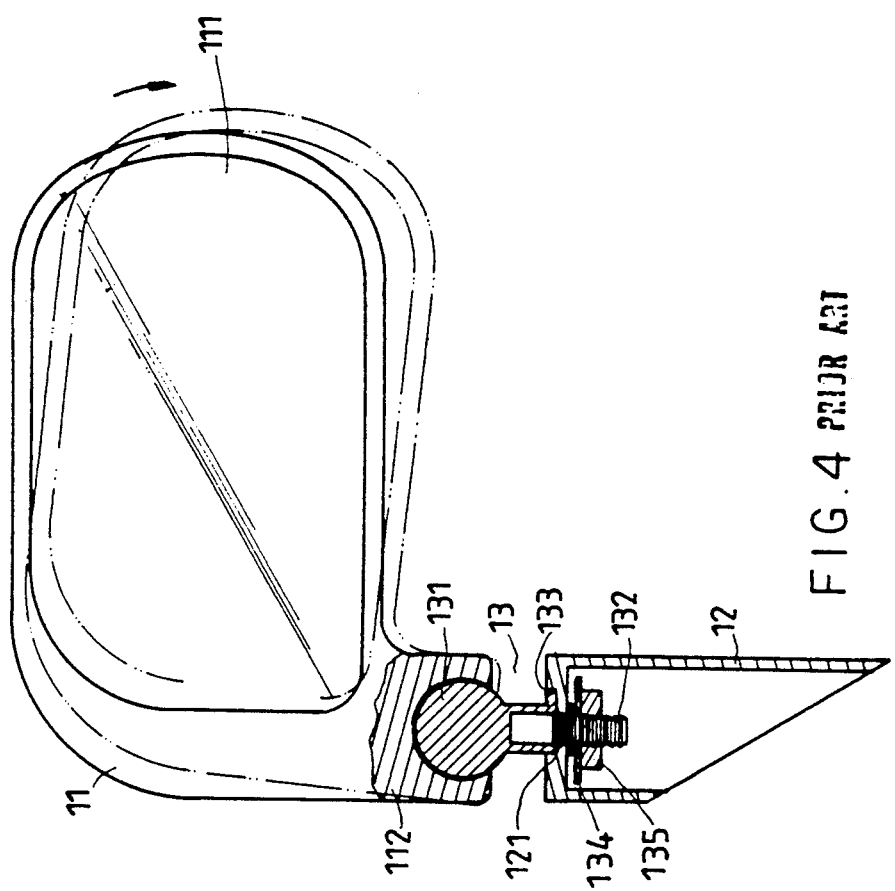
FIG. 4 is a partial cross sectional view of the typical vehicle rear view mirror.

Referring to FIGS. 1 to 3, a vehicle rear view mirror comprises generally a body 21 coupled to a base 22 by a coupler 23, the body 21 includes a mirror 211 disposed therein and an extension 212 extended downward therefrom; the base 22 is fixed to the vehicle and includes an aperture 221 formed therein; the coupler 23 includes a ball 231 and a bolt 232 extended downward from the ball 231 and extended through the aperture 221 of the base 22 and threadedly engaged with a nut 235 so that the coupler 23 can be fixed to the base 22, a washer 234 is engaged between the base 22 and the nut 235. The coupler 23 further includes a stop 233 engaged with the base 22 so that the coupler 23 is prevented from rotating relative to the base 22 and so that the nut 235 can be engaged to the bolt 232. The configuration is identical to the typical vehicle rear view mirror.

The vehicle rear view mirror in accordance with the present invention further comprises a shell 236 rotatably engaged on the ball 231 of the coupler 23 and preferably made of metal materials, the shell 236 includes an inner diameter slightly smaller than the outer diameter of the ball 231 such that the shell 236 may apply a compression force to the ball 231, i.e., the ball 231 is force-fitted within the shell 236, and such that the shell 236 will not easily rotate relative to the ball 231. The coupler 231 including the shell 236 is then molded within the extension 212 of the body 21. The shell 236 includes an annular flange 237 extended upward from and embedded within the extension 212 of the body 21 so that the shell 236 can be stably engaged within the extension 212 and will not rotate relative to the extension 212.

Accordingly, the vehicle rear view mirror in accordance with the present invention includes a shell 236 force-fitted on the ball and stably embedded within the extension of the body such that the body can be stably supported in place.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A vehicle rear view mirror comprising a body and a base connected by a coupler; and wherein the coupler includes a bolt embedded in said base to secure the mirror to the vehicle, a ball disposed on an upper portion of said bolt, and a shell force-fitted onto said ball;

said shell including an annular flange which is embedded into said body so that movement of the shell relative to the body of the mirror is eliminated.

* * * * *